INVENTOR
DARWIN D. DAVIS

BY *Samuel S Blight*

ATTORNEY

United States Patent Office 3,576,856
Patented Apr. 27, 1971

3,576,856
PROCESS FOR SIMULTANEOUS CATALYST RECOVERY AND BYPRODUCT REMOVAL
Darwin Darrell Davis, Victoria, Tex., assignor to E. I. du Pont de Nemours and Company, Wilmington, Del.
Filed Dec. 12, 1966, Ser. No. 601,170
Int. Cl. C07c 55/04
U.S. Cl. 260—531                                4 Claims

ABSTRACT OF THE DISCLOSURE

In the synthesis of 1,12-dodecanedioic acid comprising nitric acid oxidation of cyclododecanol/cyclododecanone in the presence of copper and vanadium and crystallizing the product to leave a recycle stream, a process for the simultaneous recovery of catalyst and removal of organic byproducts comprising (1) heating that recycle stream; (2) adjusting the concentrations of the components thereof to levels specified herein to form an oil phase enriched in organic byproducts and an aqueous phase enriched in catalyst; and (3) then separating those phases.

---

This invention relates to 1,12-dodecanedioic acid, and, more particularly, to a process for simultaneous removal of byproducts and catalyst recovery from the recycle liquid stream remaining after the synthesis and crystallization thereof.

The oxidation of cylododecanol/cyclododecanone to 1,12-dodecanedioic acid by nitric acid in the presence of copper-vanadium catalyst is well known in the art. 1,12-Dodecanedioic acid is useful as an intermediate in the synthesis of polyamides. The principal byproducts of the above synthesis are dibasic acids containing 4–11 carbon atoms, whi h are produced in amounts decreasing approximately as the number of carbon atoms in the dibasic acid decreases. There are also produced minor amounts of monobasic acids and nitrogenous compounds.

Of the dibasic acid byproducts, those with a higher number of carbon atoms present a greater product purification problem than do those with a lower number of carbon atoms, since the solubility of the former dibasic acids approximates that of 1,12-dodecanedioic acid, whereas the latter dibasic acids are much more soluble in aqueous nitric acid, and hence do not crystallize as readily with the product.

There is much discussion in the prior art regarding the removal of impurities, especially from adipic acid syntheses. Several of the prior art schemes for removal of impurities are based on solvent extraction (for example, British patent specification 1,015,828). However, solvent extraction necessarily involves solvent recovery operations, embodies the hazard of leakage of solvent into the nitric acid oxidation, and also entails quality problems associated with contamination of the product dibasic acid by the immiscible solvent or solvent derived materials.

Prior art processes for the recovery of copper-vanadium catalyst (for example, Belgian Pat. 619,290) include direct recycle of the filtrate from the product crystallization or removal of catalyst therefrom by ion exchange techniques.

The present invention provides a process for selectively reducing the content of undersirable byproducts (including dibasic acids on the higher end of the 4–11 carbon atom range and monobasic acids) in the recycle stream from the nitric acid oxidation of cyclododecanol/cyclododecanone to 1,12-dodecanedioic acid, while simultaneously providing for recovery of a large portion of the copper-vanadium catalyst employed in that oxidation reaction.

The term "recycle stream" as used herein is applied to that solution remaining behind after the crystallization of the product 1,12-dodecanedioic acid from the nitric acid oxidation system.

The present invention comprises (1) maintaining the temperature of the recycle stream in the range 40–110° C.; (2) adjusting the concentrations of the components of said stream to a level where the weights of the various components of the stream, on a total liquid basis, are inorganic salt, about 0.1–10%; dibasic acids, about 5–80%; and $HNO_3$, less than 25%, with the proviso that the weight of $HNO_3$ is less than about 55% of the weight of the total $HNO_3$ and water present; whereby two liquid phases are formed, one an oil phase comprising an increased proportion of organic byproducts comprising high-molecular weight dibasic acids, and the other an aqueous phase comprising an increased proportion of said copper-vanadium catalyst; and (3) separating the oil and aqueous phases. The aqueous phase can be recycled into the nitric acid oxidation reaction. The oil phase can be discarded or employed as described below. It should be noted that the aqueous phase does contain an enriched amount of lower molecular weight dibasic acids. However, since these lower molecular weight dibasic acids are more soluble than the higher molecular weight dibasic acids, the former can be recycled into the nitric acid oxidation system without interfering to a significant degree with the purity of the product 1,12-dodecanedioic acid.

The adjustment of the concentrations of the materials in the recycle stream (which comprises $HNO_3$, water, dibasic acids of 4–12 carbon atoms, monobasic acids, and catalyst) can be accomplished by employing one or a combination of techniques. The actual degree of adjustment of the concentrations required to induce phase separation and partition of organic byproducts and catalyst in the oil and aqueous phases, respectively, depends on the concentrations of the materials present in the recycle stream. Those concentrations vary widely and are dependent upon yield and byproduct distribution in the nitric acid oxidation step, the level of catalyst, whether and how often recycle stream was sent back into the nitric acid oxidation without any further treatment, etc.

Thus, in the stream to be fed into the separator, i.e., the stream in which the concentrations have been adjusted, the weight of $HNO_3$ should not exceed about 25% nor about 55% of the total weight of $HNO_3$ and water therein. Likewise the weight of inorganic salt therein should be 0.1%, and the level of dibasic acids 5–80%, preferably 10–70%. When the adjusted stream contains less than 0.1% inorganic salt, formation of an oil phase may be difficult.

Since the relative densities of the oil and aqueous phases formed according to this invention vary, it is possible to produce an adjusted stream in which the densities of the oil and aqueous phases are equivalent, thus producing an emulsion. Such a system is outside the scope of this invention, since separation as described herein is not possible in that event.

Illustrative of techniques useful in adjusting concentrations are the following. The recycle stream can be evaporated, thus reducing the $HNO_3$ and water level. Also water can be added to reduce the concentrations of the other materials. Inorganic salt (as defined below) can be added to adjust concentration and induce formation of the oil and aqueous phases. The dibasic acid level in the recycle stream can be raised by adding externally recycled oil thereto as described below.

The percentage of inorganic salt in the recycle stream is, of course, varied by the evaporation of volatiles or addition of water, as well as by the prior history of the recycle stream. Should it be desirable to adjust the concentration by addition of an inorganic salt, any one of a number of salts can be added. Illustrative of such salts are the nitrates and sulfates of $Cu^{++}$, $Na^+$, $Mg^+$, and $Ca^{++}$.

The temperature of the present process can be varied, usually in the range 40–110° C. Preferably, the temperature is about 70° C. However, for any given solution composition, there is an optimum temperature range for best results.

A more complete understanding of the present invention may be had by reference to the drawings attached hereto and made a part of the specification, wherein there are depicted schematic flow diagrams of two preferred embodiments of this invention.

THE EMBODIMENT OF FIGURE 1

Figure 1:
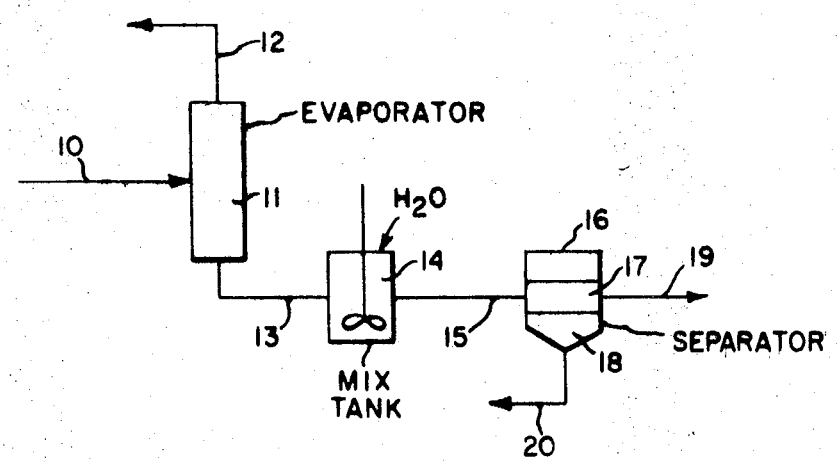
FIG. 1 depicts a preferred embodiment in which the relative concentrations of the materials in the recycle stream 10 are adjusted by first evaporating the recycle stream to reduce the $HNO_3$ (and water) levels therein, then adding water to the evaporator tails at a temperature in the range 40–110° C., to induce formation of oil and aqueous phases.

In FIG. 1, 10 is the recycle stream, as referred to hereinabove; 11 is an evaporator; 12 is a stream of water and $HNO_3$ which can be recycled into the nitric acid oxidation reaction; 13 is the liquid evaporator residue (termed herein the "evaporator tails"); 14 is a mix tank; 15 is the stream from the mix tank 14; 16 is a separator; 17 is the oil phase; 19 is the oil phase takeoff stream; 18 is the aqueous phase; and 20 is the aqueous phase takeoff stream.

Generally, the evaporator 11 is operated at elevated temperature (preferably, 85–110° C.) under reduced pressure. For example, an operating pressure in the evaporator of about 150 mm. can be employed. Otherwise, in the process of the present invention atmospheric pressure is conveniently employed, although super-atmospheric pressures can be used, if desired. In a preferred embodiment, the recycle stream is evaporated to less than 60% of its original weight.

The composition of the evaporator tails stream will vary with that of the recycle stream and with the degree of removal of $HNO_3$ therefrom (for example, the evaporator tails could contain up to nearly 100% dibasic acids). Hence, the amount of adjustment of the concentrations of 13 which is necessary to produce the two liquid phases according to this process will vary considerably. The evaporator tails stream 13 is ordinarily homogeneous at temperatures above 40° C., except for occasional separation of vanadium compounds. Such vanadium compounds can be transferred along with the liquid evaporator tails and redissolved in the mixing step.

The materials in the mix tank are held at 40–110° C., preferably about 70° C. The amount of water mixed with the evaporator tails in mix tank 14 to induce formation of the oil and aqueous layers varies. As little as 0.1 volume of water per volume of evaporator tails can induce phase separation in some cases.

The mixture from 14 is then passed into 16 where the oil and aqueous phases can be separated. The relative densities of the phases depend upon a number of factors including concentration of nitric acid in the aqueous phase. Usually, the oil phase is less dense, except when the concentration of nitric acid in the aqueous phase is less than about 4–5%. The oil phase contains dibasic acids of 4–12 carbon atoms, but is enriched in higher molecular weight dibasic acids, in concentrations inversely proportional to their solubility in dilute nitric acid.

Steps may be omitted or added to the preferred embodiment illustrated in the FIG. 1 and still be explicitly within the purview of this invention. For example, the concentration within the recycle stream can be such that, after evaporation, the addition of inorganic salt to the evaporator tails in the mix tank, rather than the addition of water, would result in separation of the aqueous and oil phases. As a further process modification, additional water could be added to the evaporator 11 to maintain the $HNO_3$ concentration below any desired level during the evaporation.

THE EMBODIMENT OF FIGURE 2

Figure 2:
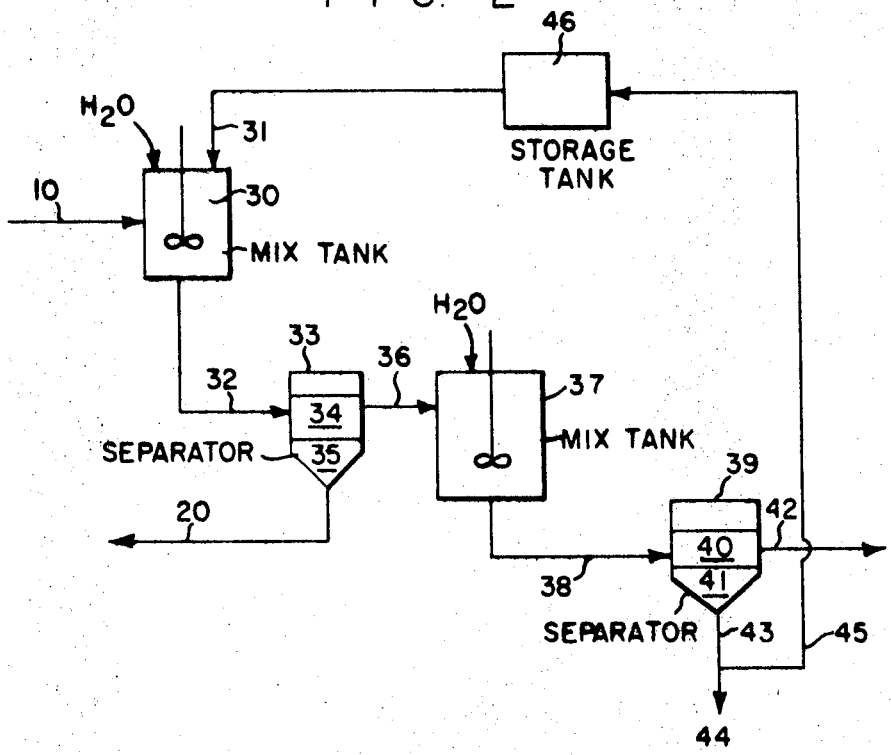
FIG. 2 depicts a preferred embodiment which does not employ evaporation, but the addition of water and externally recycled oil to induce phase separation.

The embodiment of FIG. 2, unlike that depicted in FIG. 1, does not employ evaporation to adjust concentrations. In the embodiment of FIG. 2, to recycle stream 10 (from the nitric acid oxidation of cyclododecanol/cyclododecanone to 1,12-dodecanedioic acid) there is added water and externally recycled oil. In FIG. 2, 10 is the recycle stream as referred to herein above; 30 is a mix tank, in which water and an oil stream 31 are added to the recycle stream 10; 32 is the stream from the mix tank; 33 is a separator, 34 being the organic phase and 35 the aqueous phase; 20 is the takeoff stream of the aqueous phase, as in FIG. 1; 36 is the takeoff stream of the organic phase; 37 is a mix tank in which water and stream 36 are combined; 38 is the takeoff stream from mix tank 37; 39 is a separator, 40 being the aqueous phase and 41 the oil phase; 42 is the aqueous phase takeoff stream (to be discarded); 43 is the oil phase takeoff stream; 44 is a stream through which some of the oil phase may optionally be discarded; 45 is the oil phase recycle stream; 46 is a storage tank where oil to be recycled via 31 into 30 may be held if it is not to be recycled to 30 directly.

Thus, according to the embodiment of FIG. 2, phase separation can be achieved by equilibrating the recycle stream 10 with water and an externally recycled oil phase. In the process of FIG. 2, the concentration of dibasic acid impurities in the recycle stream 10 is allowed to rise to a somewhat higher level than that which is allowed according to the embodiment outlined in FIG. 1.

EXAMPLES

The following examples are presented to illustrate, but not to restrict, the present invention. Percentages and parts are expresed by weight unless otherwise noted. Reference is made therein to the drawings.

The distribution of dibasic acids of 4–12 carbon atoms in the various streams was determined by liquid-liquid partition chromatography as described in Organic Analysis, ed. by J. Mitchell, I. M. Koltoff, E. S. Proskauer, and A. Weissberger, N.Y., Interscience Publishers, vol. III, 1956, pp. 71–75.

The distribution of monobasic acids in Example VIII was determined by esterification with $BF_3$-methanol at 50° C., followed by extraction of the esters produced thereby with hexane. The hexane was then evaporated and the ester mixture analyzed by vapor phase chromatography.

Copper was determined by electrolytic deposition according to the method in Scott's Standard Methods of Chemical Analysis, ed. by N. H. Furman, 6th ed., N.Y., Van Nostrand, vol. 1, 1962, p. 412. Vanadium was determined by the spectrophotometric method described in the same volume, p. 1215.

EXAMPLE I

This experiment illustrates the effectiveness of the process of this invention in reducing the level of higher molecular weight dibasic acid byproducts in the aqueous phase.

Referring to FIG. 1, the recycle stream 10 was subjected to evaporation. The resultant evaporator tails stream 13 had the following approximate composition: 86% dibasic acids of 4–12 carbon atoms, 1% $HNO_3$, 7.5% water, and 5% copper nitrate. In mix tank 14, 25 ml. of the evaporator tails was added to 75 ml. of water with stirring at 70° C. Two liquid phases formed, an oil and an aqueous phase, which were separated and analyzed. The actual amounts of the various dibasic acids in each phase is found in Table 1.

EXAMPLE II

This experiment illustrates the effectiveness of the process of this invention in recovery of catalyst.

The evaporator tails 13 (referring to FIG. 1) comprised approximately 80% dibasic acids, 8.1% $HNO_3$, 6.1% water, 4.8% copper nitrate, and dissolved vanadium compounds equivalent to 0.38% dissolved vanadium. To 30 ml. thereof there was added, with stirring, 90 ml. of water at 80° C. An oil and an aqueous phase formed and were separated and analyzed for copper and vanadium. The results, in Table 1, show that 98.4% of the copper and 97.7% of the vanadium was present in the aqueous phase.

EXAMPLE VII

This was a continuous experiment employing a stream of recycle stream 10 (FIG. 1).

Recycle stream 10 (having the composition described in Table 1) was fed at 1270 g./hr. into 11 along with 1000 g./hr. of water. The $HNO_3$ level in 10 was 54.9% of the total $HNO_3$ and water present. The added water served the purpose of maintaining the $HNO_3$ level (based on total water and $HNO_3$ present) below 55%, detonation being possible above that level. The evaporator was held at 88-90° C. and 150 mm. pressure. Evaporator tails 13 was removed from 11 at 108 g./hr., and comprised about 9.4% water and 11.6% $HNO_3$. Water (126 g./hr.) was added to the evaporator tails in the mix tank 14 at 70° C. Two phases formed and were separated in 16.

TABLE 1.—DISTRIBUTION OF CATALYST AND DIBASIC ACIDS

| Example | Stream (phase) | Amount of Dibasic Acids, grams | | | | | | | | | Amount of Catalyst | |
|---|---|---|---|---|---|---|---|---|---|---|---|---|
| | | $C_4$ | $C_5$ | $C_6$ | $C_7$ | $C_8$ | $C_9$ | $C_{10}$ | $C_{11}$ | $C_{12}$ | Copper, g. | Vanadium, g. |
| I | 19 (Oil) | 0.41 | 1.09 | 0.71 | 0.97 | 0.79 | 1.92 | 1.53 | 3.83 | 2.03 | | |
| | 20 (Aqueous) | 2.05 | 3.83 | 1.96 | 2.19 | 1.13 | 1.46 | 0.06 | 1.21 | 0.43 | | |
| II | 19 (Oil) | | | | | | | | | | 0.008 | 0.003 |
| | 20 (Aqueous) | | | | | | | | | | 0.474 | 0.111 |
| III | 19 (Oil) | 0.26 | 0.37 | 0.46 | 0.54 | 0.43 | 0.46 | 0.83 | 2.10 | 1.03 | | |
| | 20 (Aqueous) | 1.11 | 1.36 | 1.21 | 1.09 | 0.64 | 0.50 | 0.65 | 1.28 | 0.47 | | |
| IV | 19 (Oil) | 11.9 | 16.6 | 23.9 | 28.5 | 25.6 | 19.9 | 46.5 | 106.2 | 33.7 | 1.50 | 0.29 |
| | 20 (Aqueous) | 45.7 | 49.0 | 51.0 | 39.9 | 25.7 | 22.7 | 20.9 | 36.1 | 9.3 | 20.70 | 3.27 |
| V | 19 (Oil) | 1.32 | 1.71 | 2.42 | 2.44 | 2.02 | 2.94 | 3.28 | 7.23 | 2.27 | 0.35 | 0.02 |
| | 20 (Aqueous) | 1.80 | 2.10 | 1.75 | 1.45 | 0.92 | 0.82 | 0.84 | 1.24 | 0.36 | 1.57 | 0.35 |
| VI | 19 (Oil) | 2.11 | 3.05 | 3.43 | 3.87 | 2.88 | 3.23 | 4.65 | 11.07 | 3.28 | 0.70 | 0.05 |
| | 20 (Aqueous) | 1.33 | 1.49 | 1.18 | 0.95 | 0.54 | 0.69 | 0.41 | 0.80 | 0.18 | 0.86 | 0.22 |
| VII [1] | 10 | 0.56 | 0.69 | 0.74 | 0.71 | 0.46 | 0.58 | 0.72 | 1.88 | 0.72 | 0.21 | 0.07 |
| | 19 (Oil) | 2.6 | 3.7 | 4.8 | 5.5 | 3.9 | 5.6 | 8.3 | 23.2 | 9.3 | 0.37 | 0.10 |
| | 20 (Aqueous) | 3.3 | 3.7 | 3.6 | 2.9 | 1.7 | 1.8 | 1.4 | 3.0 | 0.9 | 1.53 | 0.57 |

[1] The distribution of catalyst and dibasic acids in the various streams of the continuous experiment of Example VII are expressed in terms of weight percentage of each stream, whereas, as noted above, in Examples I-VI the actual amounts (in grams) of the various dibasic acids and catalysts were reported.

EXAMPLE III

The feed liquid for this experiment was evaporator tails from which a smaller amount of $HNO_3$ had been evaporated than in Examples I and II, comprising 19% $HNO_3$, 13.5% water, and 61.2% dibasic acids. The amounts of copper and vanadium were not determined.

To 20 ml. of the evaporator tails there was added with stirring an equal volume of water at 70° C. An oil and an aqueous phase formed, and each was analyzed for dibasic acids. The results are found in Table 1.

EXAMPLE IV

The evaporator tails 13 (referring to FIG. 1) comprised 11.0% $HNO_3$, 9.4% water, 71.2% dibasic acids, 8.5% copper nitrate, and vanadium compounds equivalent to 0.46% vanidum. To 595 ml. thereof there was added with stirring an equal volume of water at 70° C. The distribution of catalyst and byproducts in the resultant aqueous and oil phases is found in Table 1.

EXAMPLE V

To 40 ml. of evaporator tails 13 (FIG. 1). comprising 9.2% $HNO_3$, 8.5% water, 74.2% dibasic acids, 10.6% copper nitrate, and vanadium compounds equivalent to 0.66% vanadium, there was added with stirring 20 ml. of water at 70° C.

The distribution of dibasic acids and catalyst in the resultant oil and aqueous phases is found in Table 1.

EXAMPLE VI

In this experiment only a small amount of water was added to the evaporator tails in mix tank 14.

To 50 ml. of evaporator tails 13 (FIG. 1), comprising 11.4% $HNO_3$, 10.6% water, 71.4% dibasic acids, 7.3% copper nitrate, and vanadium compounds equivalent to 0.46% vanadium, there was added 12.5 ml. of water at 70° C. The distribution of materials between the resultant oil and aqueous phase is found in Table 1.

The oil phase 17 ($HNO_3$ was 13% of the total $HNO_3$ and water) was discarded via 19 at a rate of 84 g./hr. The aqueous phase 18 from separator 16 ($HNO_3$ was 12% of the total $HNO_3$ and water) was recycled via 20 to the nitric acid oxidation reaction at a rate of 150 g./hr. The distribution of dibasic acids and catalyst in streams 19 and 20 is found in Table 1 (expressed in weight percent of each stream).

EXAMPLE VIII

This run illustrates that embodiment of the present invention which does not employ evaporation to adjust concentrations in the recycle stream.

Referring to FIG. 2, a continuous flow of 13,800 grams of recycle stream (10) per hour was fed into mix tank 30. In the recycle stream 10 the $HNO_3$ level was 55% of the total $HNO_3$ and water present. The amounts of dibasic acids and catalyst present in stream 10 are shown in Table 2. Also added to the mix tank 30 were 20,700 g./hr. of water held at 85° C. and 1900 g./hr. of externally recycled oil phase 45 from separator 39. Data on the composition of 45 are found in Table 2. The aqueous phase 35 from separator 33 was recycled into the nitric acid oxidation system (where excess water was removed by distillation) at a rate of 34,140 g./hr. via 20. The oil phase 34 was passed via 36 into a second mix tank (37) at a rate of 2260 g./hr., where 9040 g./hr. of water was added at 90° C. The resultant mixture was transferred via 38 to separator 39. There was removed from separator 39, 9400 g./hr. of the aqueous phase 40 vial line 42, and 1900 g./hr. of the heavier oil phase 41 via line 43. Nearly all of the oil phase was recycled directly via 45 and 31 to mix tank 30, omitting storage tank 46 depicted in FIG. 2, the remainder being discarded via 44.

The percentage of monobasic acid impurities present in various streams in this run is found in Table 3. The level of monobasic acid impurities was substantially reduced in the aqueous stream 20 prior to recycling thereof into the nitric acid oxidation system.

TABLE 2.—COMPOSITION OF STREAMS IN EXAMPLE VIII

| Stream | Amount of Dibasic Acids, grams | | | | | | | | Amount of Catalyst | |
|---|---|---|---|---|---|---|---|---|---|---|
| | $C_4$ | $C_5$ | $C_6$ | $C_7$ | $C_8$ | $C_9$ | $C_{10}$ | $C_{11}$ | $C_{12}$ | Copper, g. | Vanadium g. |
| 10 | 493 | 646 | 522 | 460 | 233 | 264 | 217 | 475 | 294 | 222 | 9.5 |
| 20 | 477 | 591 | 493 | 425 | 209 | 231 | 197 | 432 | 276 | 221 | 9.4 |
| 36 | 23 | 58 | 47 | 68 | 73 | 113 | 167 | 649 | 648 | | |
| 45 | 7 | 3 | 18 | 33 | 49 | 80 | 147 | 606 | 20 | 0 | 0 |
| 42 | 16 | 55 | 29 | 35 | 24 | 33 | 20 | 43 | 18 | 0.59 | 0.056 |

TABLE 3.—DISTRIBUTION OF MONOBASIC ACIDS' BETWEEN AQUEOUS AND OIL PHASES IN EXAMPLE VIII

| | Percent Monobasic Acid in Stream | | | | |
|---|---|---|---|---|---|
| | $C_8$ | $C_9$ | $C_{10}$ | $C_{11}$ | $C_{12}$ |
| Stream: | | | | | |
| 20 | .0001 | .0001 | .0001 | .0002 | .0002 |
| 36 | .0121 | .0225 | .0315 | .0516 | .0348 |
| 42 | 1.0000 | 1.0000 | 1.0000 | .0002 | 1.0000 |
| 45 | .0118 | .0228 | .0305 | .0556 | .0363 |

[1] Below the limit of detection of analytical method.

The foregoing detailed description has been given for clearness of understanding. The invention is not limited to the exact details shown and described since obvious modifications will occur to those skilled in the art.

I claim:

1. In the synthesis of 1,12-dodecanedioic acid comprising oxidizing cyclododecanol/cyclododecanone with nitric acid in the presence of copper-vanadium catalyst and separating at least a portion of said 1,12-dodecanedioic acid by crystallization to leave a recycle stream comprising $HNO_3$, water, organic byproducts comprising dibasic acids of 4–12 carbon atoms, and catalyst, a process for simultaneously recovering said copper-vanadium catalyst and reducing the amount of higher molecular weight dibasic acids and other organic byproducts in said recycle stream, said process comprising (1) maintaining said recycle stream at a temperature in the range 40–110° C.; (2) adjusting at said temperature the concentrations of the components of said stream to a level where the weights of the various components thereof, on a total liquid basis, are inorganic salt, about 0.1–10%; dibasic acids, 5–80%; and $HNO_3$, less than 25%, with the proviso that the weight of $HNO_3$ is less than 55% of the total $HNO_3$ and water present; to form two liquid phases, one an oil phase comprising an enriched amount of organic byproducts comprising said higher molecular weight dibasic acids, and the other an aqueous phase comprising an enriched amount of said copper-vanadium catalyst; said adjustment comprising the steps of (a) evaporating the recycle stream at a temperature in the range 85–110° C. under reduced pressure to less than 60% of its original weight, to reduce the levels of water and $HNO_3$ and produce an evaporator tails stream (b) adding to the evaporator tails stream at least 0.1 volume of water per volume of said evaporator tails stream, and (c) mixing the resulting material at a temperature of about 70–90° C. to form an oil and an aqueous phase; (3) separating said oil and aqueous phases; and (4) recycling the aqueous phase.

2. A process according to claim 1 wherein in said step of adjusting concentrations of the components of said recycle stream, the weight of said dibasic acids is adjusted to 10–70% on a total liquid basis.

3. In the synthesis of 1,12-dodecanedioic acid comprising oxidizing cyclododecanol/cyclododecanone with nitric acid in the presence of copper-vanadium catalyst and separating at least a portion of said 1,12-dodecanedioic acid by crystallization to leave a recycle stream comprising $HNO_3$, water, organic byproducts comprising dibasic acids of 4–12 carbon atoms, and catalyst, a process for simultaneously recovering said copper-vanadium catalyst and reducing the amount of higher molecular weight dibasic acids and other organic byproducts in said recycle stream, said process comprising (1) maintaining said recycle stream at a temperature in the range 40–110° C.; (2) adjusting at said temperature the concentrations of the components of said stream to a level where the weights of the various components thereof, on a total liquid basis, are inorganic salt, about 0.1–10%; dibasic acids, 5–80%; and $HNO_3$, less than 25%, with the proviso that the weight of $HNO_3$ is less than 55% of the total $HNO_3$ and water present; to form two liquid phases, one an oil phase comprising an enriched amount of organic byproducts comprising said higher molecular weight dibasic acids, and the other an aqueous phase comprising an enriched amount of said copper-vanadium catalyst; said adjustment comprising the steps of adding water and an externally recycled oil stream from the oxidation reaction to the recycle stream and mixing the resulting material at about 70–90° C. to form an oil and an aqueous phase; (3) separating said oil and aqueous phases; and (4) recycling the aqueous phase.

4. A process according to claim 3 wherein in said step of adjusting concentrations of the components of said recycle stream, the weight of said dibasic acids is adjusted to 10–70% on a total liquid basis.

References Cited

UNITED STATES PATENTS 3,290,367 12/1966 White et al. ———— 260—533
3,148,210 9/1964 Johnson et al. ———— 260—531

LORRAINE A. WEINBERGER, Primary Examiner

R. KELLY, Assistant Examiner

U.S. Cl. X.R.

252—476